Patented July 12, 1932

1,867,524

UNITED STATES PATENT OFFICE

STEPHEN W. ORNE, OF FOSTORIA, OHIO, ASSIGNOR TO NATIONAL CARBON COMPANY, INC., A CORPORATION OF NEW YORK

ARC LAMP ELECTRODE

No Drawing.   Application filed April 8, 1929.   Serial No. 353,651.

My invention relates to electrodes for arc lamps and especially to an electrode adapted for use in search lights of the so-called super high intensity type, that is to say, arc lamps in which the current density employed is even higher than that in the so-called high intensity arc. An example of the super high intensity arc would be the use of 16 millimeter electrodes burned at 250 amperes at approximately 90 volts. I have found that for such conditions it is desirable to use an electrode containing calcium fluoride. This calcium fluoride is preferably incorporated in the core.

An object of my invention is to devise an electrode for arc lamps for use with high current intensities, e. g. in excess of 200 amperes for a 16 mm. electrode, which has a long life, burns quietly, and in which the energy in the region of wave lengths above 5500 ÅU is high.

An example of such an electrode is a cored electrode in which the shell is made of a slow burning form of carbon, as petroleum coke, containing small amounts of boric acid with a suitable binder. The core consists of rare earth fluorides 10 parts, calcium fluoride 60 parts, high grade carbon flour 30 parts, with sufficient tar to serve as a binder.

I have found that a carbon constructed in accordance with the above embodiment of my invention will burn at a super high intensity quietly and with a satisfactory life. Comparisons between an electrode containing 60% of calcium fluoride in the core and one containing only 5% of calcium fluoride in the core show that while the 5% calcium fluoride electrode has a slightly greater maximum candle power at the center of the beam, the total light in a 2° beam is about 4% greater for the electrode containing 60% calcium fluoride. Moreover the electrode containing the greater amount of calcium fluoride showed a material increase in the quantity of light of wave lengths above 5500 ÅU. Thus the light transmitted through a red gelatin which did not transmit light of wave lengths below 5500 ÅU was relatively: 100 for electrodes containing 60% calcium fluoride, 65 for electrodes containing 5% calcium fluoride and 52 for electrodes containing no calcium fluoride in the core. The increase in the energy of wave lengths above 5500 ÅU is important since the red rays are believed to penetrate fog better and to pick up ships at sea better than white light. I have also found that the noise made by the arc is reduced by increasing the amount of calcium fluoride in the electrode.

I claim:

1. A carbon electrode consisting of a slow burning shell and a core composed of rare earth fluorides substantially 10 parts, calcium fluoride substantially 60 parts, and carbon substantially 30 parts.

2. A carbon electrode comprising a slow burning shell and a core comprising rare earth fluorides in excess of 5%, carbon in excess of 25% with the balance principally calcium fluoride, said calcium fluoride constituting at least substantially 60% of the core.

In testimony whereof I affix my signature.

STEPHEN W. ORNE.